United States Patent [19]
Addy et al.

[11] Patent Number: 5,965,861
[45] Date of Patent: Oct. 12, 1999

[54] METHOD AND APPARATUS FOR ENHANCING SECURITY IN A SELF-SERVICE CHECKOUT TERMINAL

[75] Inventors: John C. Addy; Marc B. Lynn, both of Lawrenceville, Ga.

[73] Assignee: NCR Corporation, Dayton, Ohio

[21] Appl. No.: 09/019,880

[22] Filed: Feb. 6, 1998

Related U.S. Application Data

[60] Provisional application No. 60/037,728, Feb. 7, 1997, and provisional application No. 60/045,001, Feb. 7, 1997.

[51] Int. Cl.[6] ................................................. G06K 15/00
[52] U.S. Cl. ............................ 235/383; 186/61; 364/383
[58] Field of Search .............................. 186/61; 235/383; 364/900

[56] References Cited

U.S. PATENT DOCUMENTS

| | | |
|---|---|---|
| 4,676,343 | 6/1987 | Humble et al. ............................ 186/61 |
| 4,792,018 | 12/1988 | Humble et al. ............................ 186/61 |
| 4,866,661 | 9/1989 | De Prins .................................. 364/900 |
| 4,940,116 | 7/1990 | O'Connor et al. ........................ 186/61 |
| 5,115,888 | 5/1992 | Schneider ................................. 186/61 |
| 5,124,768 | 6/1992 | Mano et al. . | 
| 5,294,555 | 3/1994 | Mano et al. . |
| 5,313,077 | 5/1994 | Yamazaki . |
| 5,315,132 | 5/1994 | Yamazaki . |
| 5,365,080 | 11/1994 | Yamazaki et al. . |
| 5,393,965 | 2/1995 | Bravman et al. ........................ 235/383 |
| 5,426,282 | 6/1995 | Humble ................................... 235/383 |
| 5,494,136 | 2/1996 | Humble ................................... 186/61 |
| 5,543,636 | 8/1996 | Yamazaki . |
| 5,554,861 | 9/1996 | Mano et al. . |
| 5,814,799 | 11/1996 | Swartz et al. ........................... 235/383 |

*Primary Examiner*—Thien M. Le
*Assistant Examiner*—Daniel S. Felten
*Attorney, Agent, or Firm*—Maginot, Addison & Moore; Needle & Rosenberg

[57] ABSTRACT

A system and method of providing security during operation of a self-service checkout terminal by detecting movement of an item within a scanner zone associated with the terminal with a video system and generating a scanning-attempt control signal in response thereto. The method also includes the step of generating an item-entered control signal if a product code associated with the item is entered into the terminal. The method further includes the step of generating an attempt-failed control signal if the item-entered control signal is not generated in response to the movement of the item within the scanner zone. Moreover, the method includes the step of detecting insertion of the item into a grocery container with the video system and generating a detection control signal in response thereto. The method yet further includes the step of generating an invalid-use control signal if the item-entered control signal has not been generated prior to generation of the detection control signal.

20 Claims, 8 Drawing Sheets

METHOD AND APPARATUS FOR ENHANCING SECURITY IN A SELF-SERVICE CHECKOUT TERMINAL

This application claims the benefit of U.S. Provisional Application No. 60/037,728, filed Feb. 7, 1997, and U.S. Provisional Application No. 60/045,001, filed Feb. 7, 1997.

CROSS REFERENCE TO RELATED APPLICATIONS

Cross reference is made to commonly assigned U.S. patent application Ser. No. 09/020,322, entitled "Method And Apparatus For Detecting Movement Patterns At A Self-Service Checkout Terminal", filed on even date, the entirety of which is incorporated herein by reference.

BACKGROUND OF THE INVENTION

The present invention relates generally to a checkout or point-of-sale (POS) terminal, and more particularly to a method and apparatus for enhancing security in a self-service checkout terminal.

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers.

It is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary supervision and security. Such supervision and security includes preventing a customer from either inadvertently or intentionally placing an item in a grocery bag without scanning the item, or scanning one item, but placing a second item of greater value in the bag. Thus, another concern when evaluating a self-service checkout terminal is the level of security provided against illicit use of the self-service checkout terminal by customers.

What is needed therefore is a self-service checkout terminal which assists or otherwise supervises a customer in the use thereof. What is further needed is a self-checkout terminal which provides security from theft and other improprieties.

SUMMARY OF THE INVENTION

Briefly, the present invention is directed to a system and method for providing security at a self-checkout terminal by monitoring several events that occur at the terminal, including the movement of user's hand with respect to various components of the terminal (scanner, bagging area, scale, etc.), physical characteristics of items, and signals generated by the various components of the terminal.

The above and other objects, features, and advantages of the present invention will become apparent from the following description and the attached drawings.

DETAILED DESCRIPTION OF THE INVENTION

Figure 1:
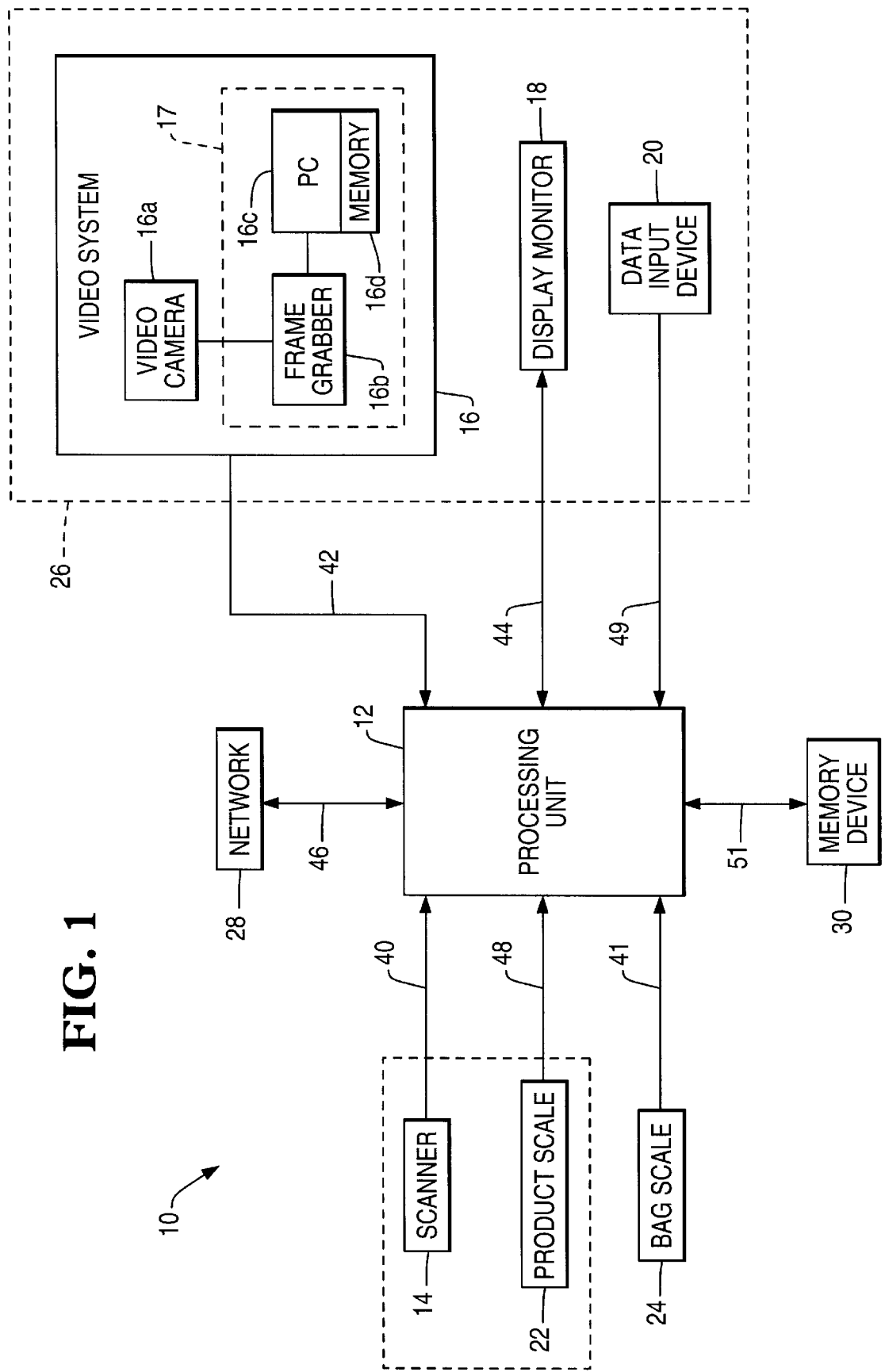
FIG. 1 is a simplified block diagram of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is show a simplified block diagram of a self-service checkout terminal 10. The self-service checkout terminal 10 includes a processing unit 12, a scanner 14, a video system 16, a display monitor 18, a data input device 20, a product scale 22, a bag scale 24, a network 28, and a memory device 30.

The scanner 14 conventionally scans or reads a product identification code such as a Universal Product Code (UPC), industrial symbol(s), alphanumeric character(s), or other indicia associated with an item to be purchased. In particular, the scanner 14 includes a horizontally disposed scanning window (not shown). The product scale 22 is integrated with the scanner 14. More specifically, if an item such as produce is placed upon the scanning window of the scanner 14, the product scale 22 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The video system 16 includes a video camera 16a, a frame grabber 16b, and a processing system 16c such as a personal computer (PC). The PC 16c and the frame grabber 16b are collectively referred to a video processor 17. The video processor 17 receives a standard video signal format, such as RS-170, NTSC, CCIR, or PAL, from the video camera 16a.

Video output signals from the video camera 16a are input to the frame grabber 16b. The frame grabber 16b operates to convert the analog video signals from the video camera 16a into a digital image which is stored within a memory 16d for subsequent processing by the video processor 17. Once representations of the stream of digital images from the video camera 16a are sequentially stored in memory 16d, the video processor may begin to analyze or otherwise process the video image.

The video camera 16a is positioned in a location in which the video system 16 detects motion associated with a number of "target areas." What is meant herein by use of the term "target area" of the video system 16 is an area across which the video system 16 is capable of detecting motion. For example, a first target area is defined by the maximum range in which an item can be successfully scanned as it is passed across the scanner 14. A second target area is defined by an area proximate a bagwell (not shown) associated with the self-service checkout terminal 10. What is meant herein by the term "bagwell" is an area in which a number of grocery bags are positioned in order to be loaded by the customer with items which have been scanned with the scanner 14 during a checkout transaction. It should therefore be appreciated that motion proximate the bagwell of the self-service checkout terminal 10 is indicative of an item being placed into or removed from one of the grocery bags.

The specific manner in which the video system operates to detect the various motions referred to herein, is described in more detail in the aforementioned related application which is incorporated herein by reference.

The display monitor 18 displays instructions which serve to guide a customer through a checkout procedure. For example, an instruction may be displayed on the display monitor 18 which instructs the customer to remove an item from a grocery cart or trolley (not shown) and pass the item over the scanner 14. If the scanner 14 successfully scans or reads the bar code associated with the item, then a visual indication is generated on the display monitor 18. If for any reason the scanner 14 cannot read or otherwise determine the bar code associated with the item, a visual error message may be generated on the display monitor 18 as described further below. Moreover, the display monitor 18 may be a known touch screen monitor which can generate data signals when certain areas of the screen are touched by a user. In addition to, or in lieu of the display monitor 18, a device for generating audio or voice instructions may also be included. For example, a voice generating device (not shown) may be used to inform the customer of the type and cost of each item scanned thereby reducing the number of occasions in which the customer must look at the display monitor 18 during an itemization process associated with operation of the self-service checkout terminal 10.

The bag scale 24 is disposed in the bagwell. The grocery bags are positioned on the bag scale 24 during loading thereof by the customer during the itemization process. The bag scale 24 monitors the weight of items which are placed into and taken out of the grocery bags as described further below.

The video system 16, display monitor 18, and the data input device 20 are integrated in order to lower costs associated with the self-service checkout terminal 10. In particular, the video system 16, the display monitor 18, and the data input device 20 are components of a known Automated Teller Machine (ATM) 26 which is included in the self-service checkout terminal 10.

The processing unit 12 is electrically coupled to the scanner 14, the video system 16, the display monitor 18, the data input device 20, the product scale 22, and the bag scale 24. The processing unit 12 is also electrically coupled to the network 28 and the memory device 30 as shown in FIG. 1.

The processing unit 12 monitors output signals generated by the scanner 14 and the video system 16 through communication lines 40 and 42, respectively, so as to supervise and provide security monitoring of a checkout procedure as described further below.

The processing unit 12 communicates with the display monitor 18 through a data communication line 44. The processing unit 12 generates output signals on the data communication line 44 which cause various instructional messages to be displayed on the display monitor 18. The display monitor 18 may include known touch screen technology which can generate output signals when the customer touches a particular area of the display screen associated with the display monitor 18. The signals generated by the display screen are transmitted to the processing unit 12 via the data communication line 44.

The processing unit 12 is coupled to the product scale 22 via a data communication line 48. Similarly, the processing unit 12 is coupled to the bag scale 24 via a data communication line 50.

The data input device 20 is coupled to the processing unit 12 through a data communication line 49. The data input device 20 may include one or more of a known keypad, a touch pad, a credit/debit card reader, or a smart card reader.

The processing unit 12 includes network interface circuitry (not shown) which conventionally permits the self-service checkout terminal 10 to communicate with the network 28 such as a LAN or WAN through a wired connection 46. The processing unit 12 communicates with the network 28 during the checkout procedure in order to communicate with a paging system (not shown) or the like which pages or otherwise alerts the retailer's personnel as described further below. In addition, the processing unit 12 communicates with the network 28 to obtain information such as pricing information on an item being scanned, and also to verify customer credit approval when appropriate. The network interface circuitry associated with the self-service checkout terminal 10 may include a known Ethernet expansion card, and the wired connection 46 may include a known twisted-pair communication line. Alternatively, the network interface circuitry may support wireless communications with the network 28.

The processing unit 12 communicates with the memory device 30 via a data communication line 51. The memory device 30 is provided to maintain a number of electronic logs associated with operation of the self-service checkout terminal 10. More specifically, the memory device 30 electronically maintains an event log, a suspicion log, and a maintenance log.

The event log is provided to track or otherwise tally the number of occasions in which a given customer operates the self-service checkout terminal 10 improperly. In particular, the event log tracks those occasions in which the customer unintentionally operated the self-service checkout terminal 10 improperly, along with those occasions in which it can be inferred with a high degree of confidence that the customer intentionally operated the self-service checkout terminal 10 improperly for illicit purposes such as theft. For example, if the video system 16 detects that the customer passed an item across the scanning window of the scanner 14, but the product identification code was not read by the scanner 14, an entry is made in the event log. This is true since the product identification code may not have been read due to an unintentional improper orientation of the item being scanned. However, the possibility does exist that the customer may have intentionally prevented the product identification code from being read (e.g. by placing his or her thumb over the code while passing the item over the scanner 14). Therefore, an entry is made in the event log.

The suspicion log on the other hand, is provided to track or otherwise tally the number of occasions in which a given customer operates the self-service checkout terminal 10 improperly, and it can be inferred with a high degree of confidence that the customer was intentionally operating the self-service checkout terminal 10 improperly for illicit reasons such as theft. For example, if the video system 16 detects that the customer placed an item in one of the grocery bags, but the video system 16 did not detect motion associated with the customer attempting to scan the item, and the scanner 14 did not read a product identification code associated with the item, it can be inferred with a high degree of confidence that the customer was intentionally operating the self-service checkout terminal 10 improperly. This is true since the customer apparently made no attempt to scan the item prior to placing the item into one of the grocery bags. Therefore, an entry is made in the suspicion log.

The maintenance log is provided to track or otherwise tally the number of occasions in which a given customer is using the self-service checkout terminal 10 properly, but a component of the self-service terminal 10 is not functioning correctly. For example, if the scanner 14 reads a product identification code associated with an item, but the video system 16 did not detect motion associated with a scanning attempt, the video system 16 may be out of calibration or otherwise in need of repair. Therefore, an entry is made in the maintenance log.

It should be appreciated that a predetermined threshold value may be established for each of the following: the event log, the suspicion log, and the maintenance log. More specifically, a retailer may establish a threshold value for each of the logs that once exceeded causes the processing unit 12 to communicate with the network 28 in order to page or otherwise alert the retailer's personnel as to certain events surrounding the operation of the self-service checkout terminal 10 by a given customer. For example, a customer service manager may be paged to assist the given customer if the event log exceeds a value of three. Moreover, a security officer may be paged to audit or otherwise investigate the given customer's transaction if the suspicion log exceeds a value of 1½.

It should be appreciated that the communication lines 40, 42, 44, 46, 48, 49, 50, and 51 may communicate one or more control signals, audio signals, and/or video signals between the various components of the self-service checkout terminal 10 as described above.

Figure 2:
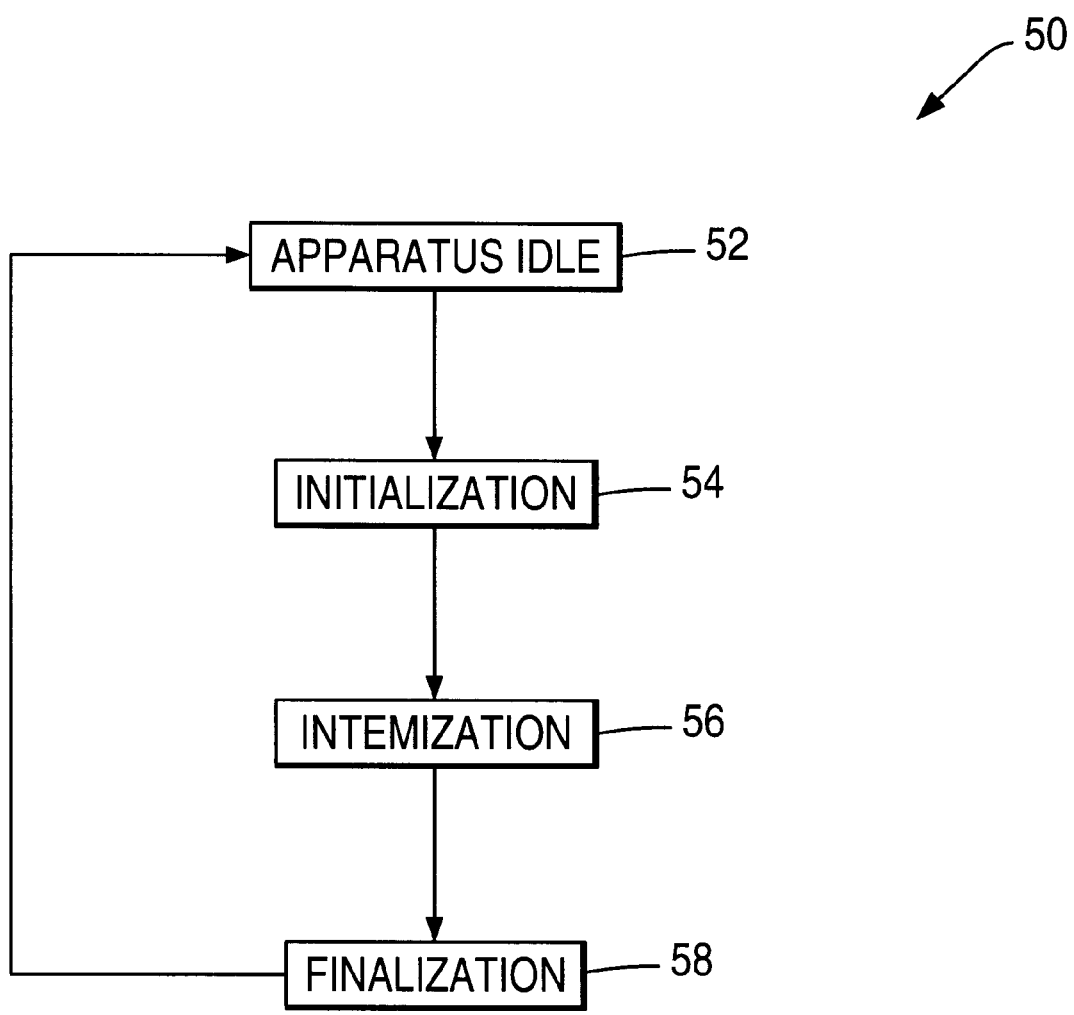
FIG. 2 is a flowchart setting forth the general procedure for checking out items through the self-service checkout terminal of FIG. 1.

Referring now to FIG. 2, there is shown a flowchart which sets forth a general procedure 50 for checking out items through the self-service checkout terminal 10. When a customer arrives at the self-service checkout terminal 10, the self-service checkout terminal 10 is in an idle state (step 52). An initialization step 54 is executed prior to checking out items for purchase. In particular, one or more initialization instructions are displayed on the display monitor 18 which instruct the customer to (1) select a desired method of payment, and/or (2) identify himself or herself by inserting a shopping card, debit card, credit card, smart card, etc. into the data input device 20.

At the completion of the initialization step 54, the routine 50 advances to an itemization step 56 where the customer scans the individual items for purchase across the scanner 14. After all of the items for purchase have been scanned, the routine 50 advances to a finalization step 58 where a grocery receipt is printed, payment is tendered, a credit card or debit card account is charged, or a smart card is decreased. After completion of the finalization step 58, the routine 50 returns to step 52 in which the self-service checkout terminal 10 remains in the idle condition until a subsequent customer initiates a checkout procedure.

Figure 3A:
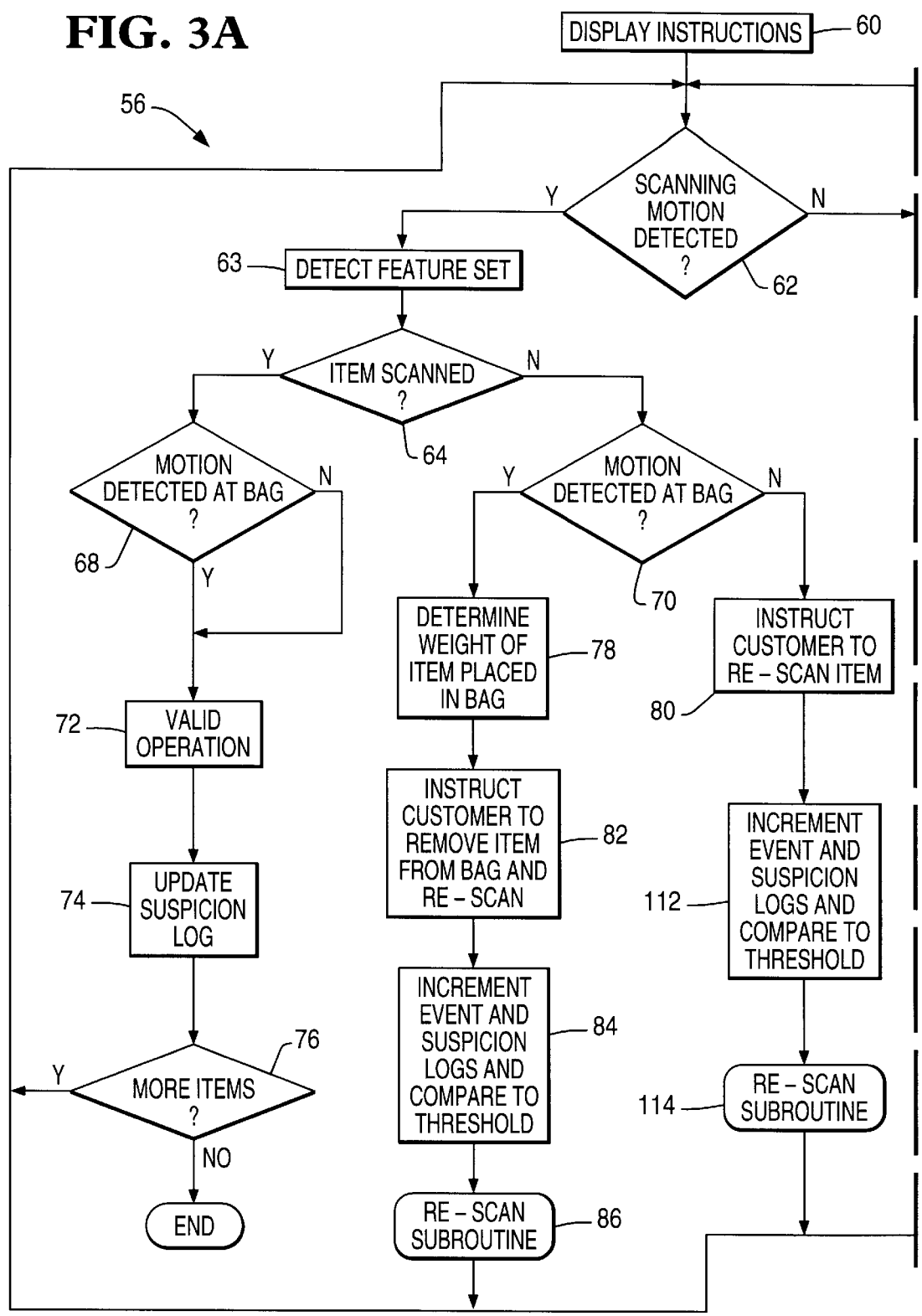
FIGS. 3A and 3B are flowcharts setting forth in detail the itemization process.
Figure 3B:
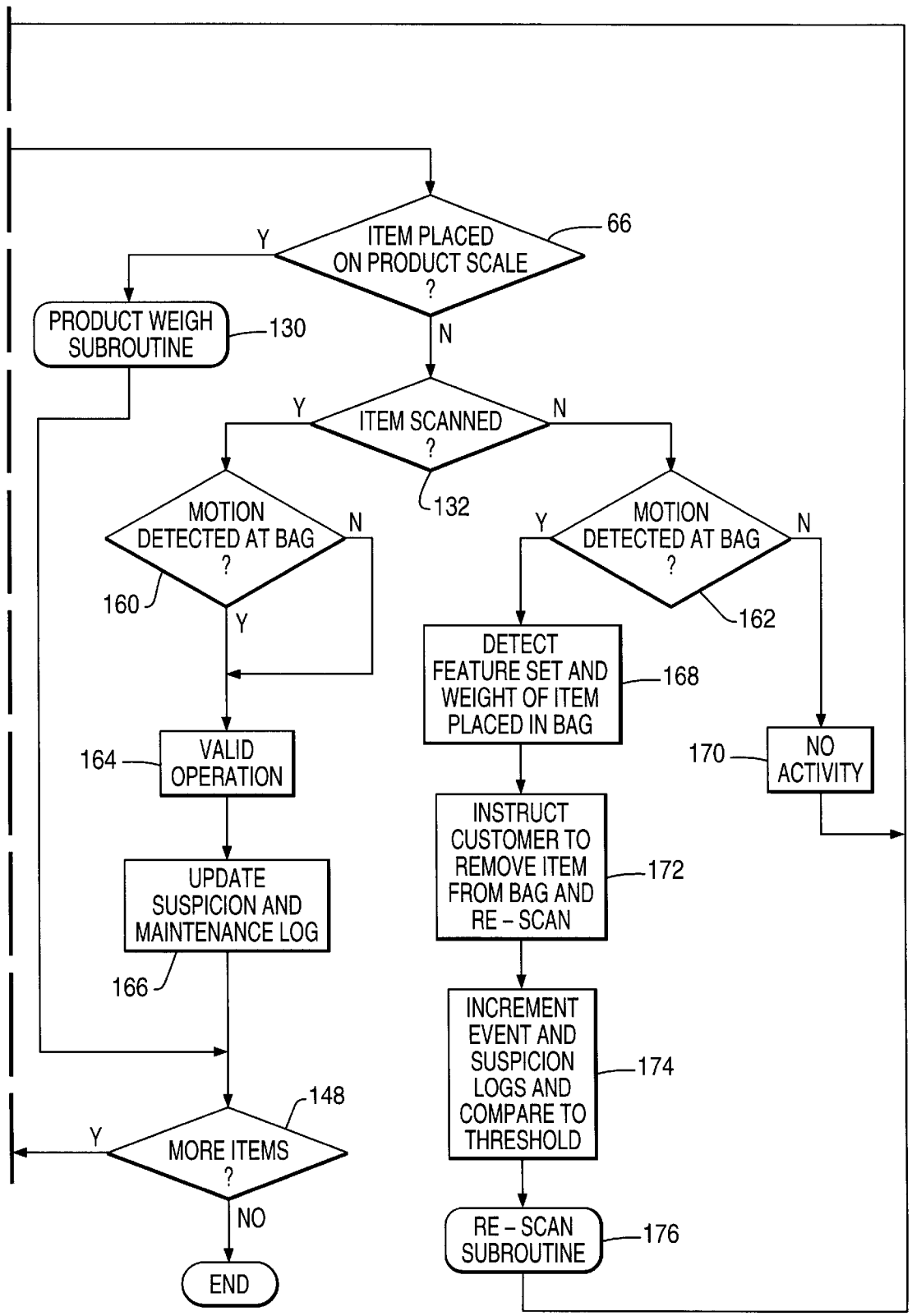

Referring now to FIGS. 3A and 3B, there is shown a flowchart setting forth the itemization step 56 in greater detail. After the initialization step 54 (FIG. 2) is completed, the routine 56 advances to step 60 where a message is displayed on the display monitor 18 which instructs the customer to pass or otherwise scan individual items across or adjacent the scanner 14 with the product identification code facing the scanning window.

The routine 56 then advances to step 62 where the processing unit 12 scans or reads the data communication line 42 to determine whether the video system 16 has detected the customer scanning an item across the target area associated with the scanner 14. In particular, the video system 16 generates an output signal which is sent to the processing unit 12 once the video system 16 detects the motion of the customer scanning the item across the scanner 14. If a scanning motion is detected, the routine 56 advances to step 63. If a scanning motion is not detected, the routine 56 advances to step 66.

In step 63, the processing unit 12 stores into a memory location associated therewith a file which includes a digital image of a feature set associated with the item that was passed across the scanner 14 in step 62. What is meant herein by the term "feature set" is a number of physical characteristics associated with the item being scanned. For example, the feature set may include the size, shape, and color of the item. After the processing unit 12 determines the feature set associated with the item being scanned, the routine 56 advances to step 64. This feature set is derived by the video system 16 in accordance with the procedures described in the aforementioned related application.

In step 64, the processing unit 12 scans or reads the data communication line 40 to determine whether the scanner 14 has successfully read or otherwise captured the product identification code associated with the item. More specifically, the scanner 14 generates an output signal which is sent to the processing unit 12 once the scanner 14 successfully reads the product identification code associated with the item. If the code is successfully read from the item, the routine 56 advances to step 68. If the code is not successfully read from the item, the routine 56 advances to step 70.

In step 68, the processing unit 12 determines if the scanned item is placed into one of the grocery bags in the bagwell. More specifically, the video system 16 generates an output signal which is sent to the processing unit 12 once the video camera has detected a customer placing the item into one of the grocery bags. After scanning an item, the customer may opt not to immediately place the item into one of the grocery bags. For example, if the customer scanned a loaf of bread, the customer may wait to place the bread into a grocery bag until it is nearly full thereby preventing the bread from being crushed. Hence, whether or not the video system 16 generates an output signal in step 68, the routine 56 is advanced to step 72.

In step 72, the processing unit 12 determines that a successful checkout operation has been completed for the particular item selected for purchase. More specifically, the processing unit 12 concludes that the customer apparently scanned an item over the scanner 14 because the video system 16 generated an output signal on data communication line 42, and that the item was in fact scanned because the scanner 14 generated an output signal on the data communication line 40. The processing unit 12 may then communicate with the network 28 to obtain the price of the properly scanned item for use in generating a bill or receipt at the end of the checkout procedure. The routine 56 then advances to step 74.

In step 74, the processing unit updates the suspicion log. In particular, the processing unit 12 queries the memory device 30 to determine if the item that was successfully scanned in step 64 had previously been unsuccessfully scanned. If the customer has not previously attempted to scan the item that was successfully scanned in step 64, no change is made to the suspicion log. However, if the customer has previously tried to scan the item that was successfully scanned in step 64, the processing unit 12 determines what change, if any, should be made to the suspicion log.

As discussed below in more detail, the processing unit 12 identifies events in which items are unsuccessfully scanned as either alpha-type events or beta-type events. The alpha-type events are those events in which the customer scanned an item unsuccessfully in a manner which is indicative of a relatively low possibility that the customer is attempting to commit an impropriety such as theft. Conversely, the beta-type events are those events in which the customer scanned an item unsuccessfully in a manner which is indicative of a relatively high probability that the customer is attempting to commit an impropriety such as theft.

Therefore, in step 74, if the processing unit 12 determines that the item that was successfully scanned in step 64 was previously scanned unsuccessfully in an alpha-type event, the processing unit 12 causes the suspicion log to be decreased by a predetermined value such as ½. However, if the processing unit 12 determines that the item that was successfully scanned in step 64 was previously scanned unsuccessfully in a beta-type event, the processing unit 12 does not change the value of the suspicion log. The routine 56 then advances to step 76.

In step 76, the processing unit 12 monitors the communication line 49 from the data input device 20, the communication line 44 from the display monitor 18, the communication line 42 from the video system 16, and the communication line 40 from the scanner 14 in order to determine whether there are more items to be scanned. In particular, a message is displayed on the display monitor 18 instructing the customer to touch a particular touch screen area displayed on the display monitor 18, or to touch a particular key associated with the data input device 20, when the customer has completed scanning all of the items for purchase.

If a particular signal is detected on either of the communication lines 44 or 49, the processing unit 12 determines that the checkout procedure is complete and the routine 56 advances to the finalization step 58 (see FIG. 2). If a signal is detected on either one or both of the communication lines 42, 40, the processing unit 12 determines that the customer is attempting to scan another item for purchase, and the routine advances to step 62.

Returning to step 64, if the product identification code was not successfully read from the item being scanned, the routine 56 advances to step 70. Step 70 follows the same procedure outlined above with regard to step 68. In particular, the processing unit 12 determines if the unsuccessfully scanned item is placed into one of the grocery bags in the bagwell. More specifically, the video system 16 generates an output signal which is sent to the processing unit 12 once the video system 16 has detected the customer placing the unsuccessfully scanned item into one of the grocery bags. If the unsuccessfully scanned item is placed into one of the grocery bags, the routine 56 advances to step 78. If the unsuccessfully scanned item is not placed in the grocery bag, the routine advances to step 80.

In step 78, the processing unit 12 determines the weight of the item which was placed into the grocery bag. More specifically, the bag scale 24 generates an output signal which is sent to the processing unit 12 once the bag scale 24 has determined the weight of the item being placed in the grocery bag. The routine 56 then advances to step 82.

In step 82, the processing unit 12 causes a message to be displayed on the display monitor 18 which instructs the customer to remove the item from the grocery bag and thereafter re-scan the item. The routine 56 then advances to step 84.

In step 84, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. The routine 56 then advances to a re-scan subroutine 86.

Figure 4:
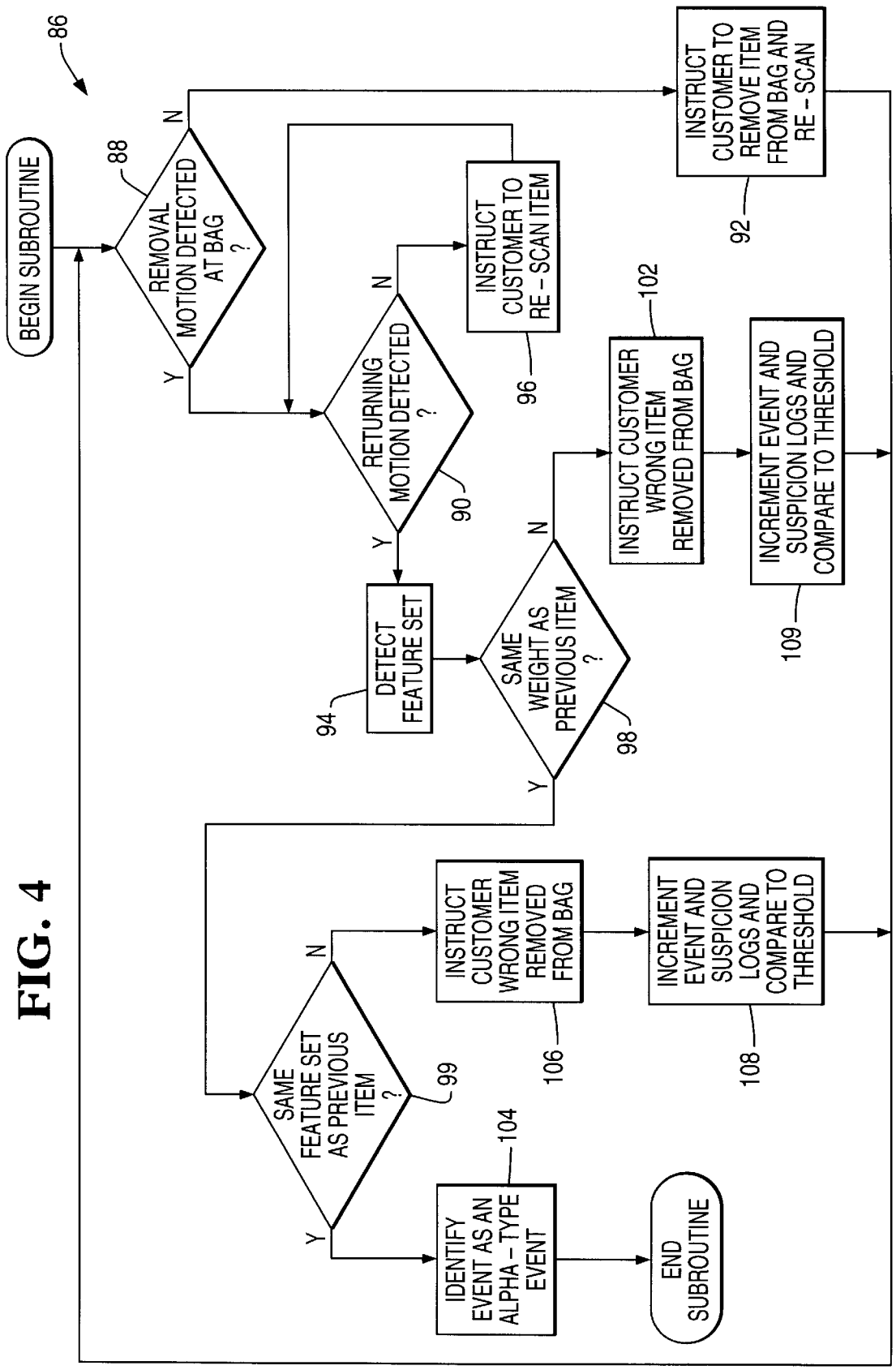
FIG. 4 is a flowchart setting forth in detail a first re-scan subroutine of the itemization process.

Referring now to FIG. 4, there is shown a flow chart setting forth the re-scan subroutine 86 in greater detail. After completion of step 84 (see FIG. 3A), the subroutine 86 advances to step 88. In step 88, the processing unit 12 determines if the customer removed the unsuccessfully scanned item from the grocery bag as instructed. More specifically, the video system 16 generates an output signal which is sent to the processing unit 12 once the video system 16 has detected the customer removing the unsuccessfully scanned item from the grocery bag. If the unsuccessfully scanned item is removed from the grocery bag, the subroutine 86 advances to step 90. If the unsuccessfully scanned item is not removed from the grocery bag, the subroutine 86 advances to step 92.

In step 90, the processing unit 12 scans or reads the data communication line 42 to determine whether the video system 16 has detected motion associated with the customer moving the unsuccessfully scanned item across the target area of the scanner 14 in a direction which is opposite to the direction that the customer would move the item if the customer was attempting to scan the item. It should be appreciated that such motion is indicative of the customer returning the item to the area proximate the scanner 14 for a subsequent scanning attempt.

The video system 16 generates an output signal which is sent to the processing unit 12 once the video system 16 has detected the customer retuning the unsuccessfully scanned item to the area proximate the scanner 14. If the unsuccessfully scanned item is returned to the area proximate the scanner 14, the subroutine 86 advances to step 94. If the unsuccessfully scanned item is not returned to the area proximate the scanner 14, the subroutine 86 advances to step 96.

In step 94, the processing unit 12 stores into a memory location associated therewith a file which includes a digital image of a feature set associated with the item that was returned across the area proximate scanner 14 in step 90. After the processing unit 12 determines the feature set associated with item being returned, the subroutine 86 advances to step 98.

In step 98, the processing unit 12 determines the weight of the item which was removed from the grocery bag. More specifically, upon removal of the item from the grocery bag, the bag scale 24 generates an output signal which is sent to the processing unit 12 once the bag scale 24 has determined the weight of the item being removed from the grocery bag. The processing unit 12 then compares the weight of the item that was removed from the bag with the weight of the item that was placed in the bag as determined by the bag scale 24 in step 78 (see FIG. 3A). If the weight of the item being removed from the grocery bag is determined to be the same as the weight of the item which was placed into the grocery bag (within an acceptable tolerance range) the subroutine 86 advances to step 100. If the weight of the item being removed from the grocery bag is determined not to be the same as the weight of the item that was placed into the grocery bag, the subroutine 86 advances to step 102.

In step 100, the processing unit 12 determines if the feature set of the item that was removed from the grocery bag is the same as the feature set of the item that was placed in the grocery bag. In particular, the processing unit 12 compares the electronic file of the feature set of the item that was removed from the grocery bag (as detected in step 94) with the electronic file of the feature set of the item that was placed in the bag (as detected in step 63 of FIG. 3A). If the feature set of the item being removed from the grocery bag is determined to be the same as the feature set of the item that was placed into the grocery bag (within an acceptable tolerance range), the subroutine 86 advances to step 104. If the feature set of the item being removed from the grocery bag is determined not to be the same as the feature set of the item that was placed into the grocery bag, the subroutine 86 advances to step 106.

In step 104, the processing unit 12 determines that the customer has successfully removed the proper item from the grocery bag in order to re-scan the item. In particular, the processing unit 12 concludes that (1) the customer removed an item from the grocery bag (step 88), (2) the customer returned the item to the area proximate the scanner 14 (step 90), (3) the item removed from the grocery bag has the same weight as the item placed in the grocery bag (step 98), and (4) the item removed from the grocery bag has the same feature set as the item placed in the grocery bag (step 100).

Further in step 104, the processing unit 12 determines that (1) there is a relatively low probability that the customer intentionally caused the item not to be scanned in step 64 (see FIG. 3A), and (2) the customer properly removed the correct item for a subsequent re-scan attempt. Therefore, the processing unit identifies the event as an alpha-type event. More specifically, the processing unit 12 generates an output signal which is sent to the memory device 30 which identifies the item as an alpha-type event. Therefore, if the item is subsequently scanned correctly, the suspicion log will be decreased by a predetermined value as discussed above in regard to step 74. The subroutine 86 then ends thereby returning to step 62 of the routine 56 to monitor the re-scanning attempt of the item.

Returning now to step 100, if the feature set of the item removed from the grocery bag is not the same as the feature set of the item that was placed in the bag, the subroutine 86 advances to step 106. In step 106, the processing unit 12 causes a message to be displayed on the display monitor 18 which instructs the customer that the wrong item was removed from the grocery bag and that the correct item should be removed from the grocery bag for re-scanning. The subroutine 86 then advances to step 108.

In step 108, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 86 then advances to step 88 to monitor the removal of a subsequent item from the grocery bag.

Returning now to step 98, if the weight of the item removed from the grocery bag is not the same as the weight set of the item that was placed in the bag, the subroutine 86 advances to step 102. In step 102, the processing unit 12 causes a message to be displayed on the display monitor 18 which instructs the customer that the wrong item was removed from the grocery bag and that the correct item should be removed from the grocery bag for re-scanning. The subroutine 86 then advances to step 110.

Step 110 follows the same procedure outlined above with regard to step 108. In particular, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 86 then advances to step 88 to monitor the removal of a subsequent item from the grocery bag.

Returning now to step 90, if the unsuccessfully scanned item is not returned to the area proximate the scanner 14 within a reasonable period of time, the subroutine 86 advances to step 96. In step 96, the processing unit 12 causes a message to be displayed on the display monitor 18 which instructs the customer to re-scan the item which was removed from the grocery bag. The subroutine 86 then loops back to step 90.

Returning now to step 88, if the unsuccessfully scanned item is not removed from the grocery bag within a reasonable period of time, the subroutine 86 advances to step 92. In step 92, the processing unit 12 causes a message to be displayed on the display monitor 18 which re-instructs the customer to remove the item from the grocery bag. The subroutine 86 then loops back to step 88.

Returning back to step 70 of the routine 56 in FIG. 3A, if the unsuccessfully scanned item is not placed in the grocery bag, the routine advances to step 80. In step 80, the processing unit 12 causes a message to be displayed on the display monitor 18 which instructs the customer to remove the item from the grocery bag and thereafter re-scan the item. The routine 56 then advances to step 112.

Step 112 follows the same general procedure outlined above in regard to step 84. In particular, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the routine 56 then advances to a re-scan subroutine 114.

Figure 5:
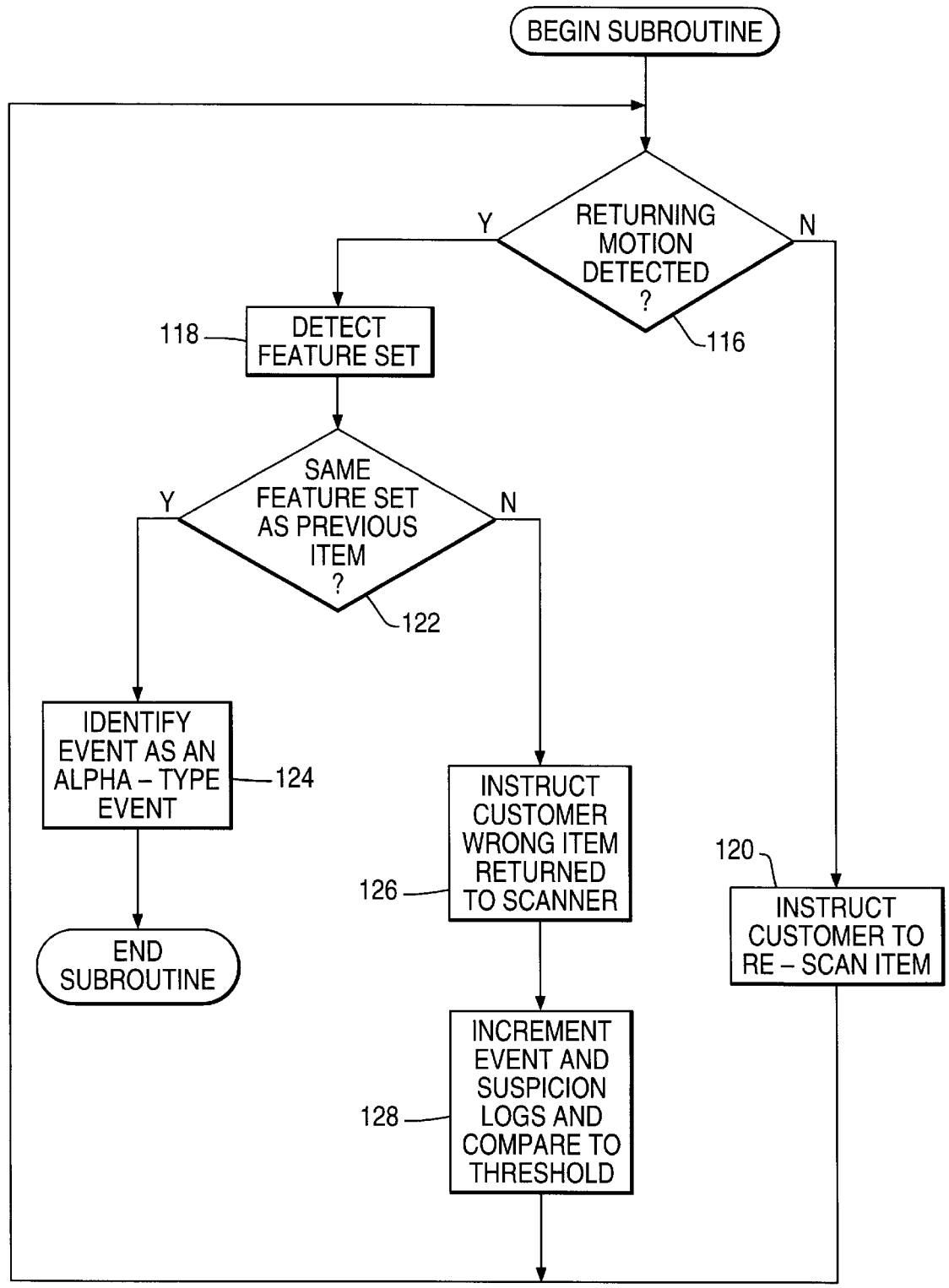
FIG. 5 is a flowchart setting forth in detail a second re-scan subroutine of the itemization process.

Referring now to FIG. 5, there is shown a flow chart setting forth the re-scan subroutine 114 in greater detail. After completion of step 112 (see FIG. 3A), the subroutine 114 advances to step 116. In step 116, the processing unit 12 scans or reads the data communication line 42 to determine whether the video system 16 has detected motion associated with the customer moving the unsuccessfully scanned item across the target area of the scanner 14 in a direction which is opposite to the direction that the customer would move the item if the customer was attempting to scan the item. It should be appreciated that such motion is indicative of the customer returning the item to the area proximate the scanner 14 for a subsequent scanning attempt.

The video system 16 generates an output signal which is sent to the processing unit 12 once the video system 16 has detected the customer returning the unsuccessfully scanned item to the area proximate the scanner 14. If the unsuccessfully scanned item is returned to the area proximate the scanner 14, the subroutine 114 advances to step 118. If the unsuccessfully scanned item is not returned to the area proximate the scanner 14, the subroutine 114 advances to step 120.

In step 118, the processing unit 12 stores into a memory location associated therewith a file which includes a digital image of a feature set associated with the item that was returned across the area proximate scanner 14 in step 116. After the processing unit 12 determines the feature set associated with item being returned, the subroutine 114 advances to step 122.

In step 122, the processing unit 12 determines if the feature set of the item returned to the area proximate the scanner 14 is the same as the feature set of the item that was unsuccessfully scanned. In particular, the processing unit 12 compares the electronic file of the feature set of the item that was returned to the area proximate the scanner 14 (as detected in step 118) with the electronic file of the feature set of the item which was unsuccessfully scanned (as detected in step 63 of FIG. 3A). If the feature set of the item being returned to the area proximate the scanner 14 is determined to be the same as the feature set of the item that was unsuccessfully scanned (within an acceptable tolerance range), the subroutine 114 advances to step 124. If the feature set of the item being returned to the area proximate the scanner 14 is determined not to be the same as the feature set of the item that was unsuccessfully scanned, the subroutine 114 advances to step 126.

In step 124, the processing unit 12 determines that the customer has successfully returned the proper item to the area proximate the scanner 14 in order to re-scan the item. In particular, the processing unit 12 concludes that (1) the customer returned the item to the area proximate the scanner 14 (step 116), and (2) the item returned to the area proximate the scanner 14 has the same feature set as the item which was unsuccessfully scanned (step 122).

The processing unit 12 determines that (1) there is a relatively low probability that the customer intentionally caused the item not to be scanned in step 64 (see FIG. 3A), and (2) the customer properly returned the correct item for a subsequent re-scan attempt. Therefore, the processing unit identifies the event as an alpha-type event. More specifically, the processing unit 12 generates an output signal which is sent to the memory device 30 which identifies the event as an alpha-type event. Therefore, if the item is subsequently scanned correctly, the suspicion log will be decreased by a predetermined value as discussed above in regard to step 74. The subroutine 114 then ends thereby returning to step 62 of the routine 56 to monitor the re-scanning attempt of the item.

Returning now to step 122 in FIG. 5, if the feature set of the item returned to the area proximate the scanner 14 is not the same as the feature set of the item that was unsuccessfully scanned, the subroutine 114 advances to step 126. In step 126, the processing unit 12 causes a message to be displayed on the display monitor 18 which instructs the customer that the wrong item was returned to the area proximate the scanner 14 and that the correct item should be returned to the area proximate the scanner 14 for re-scanning. The subroutine 114 then advances to step 128.

In step 128, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 114 then advances to step 116 to monitor the return of a subsequent item to the area proximate the scanner 14.

Returning now to step 116, if the unsuccessfully scanned item is not returned to the area proximate the scanner 14 within a reasonable period of time, the subroutine 114 advances to step 120. In step 120, the processing unit 12 causes a message to be displayed on the display monitor 18 which reinstructs the customer to re-scan the item. The subroutine 114 then loops back to step 116.

Returning to step 62 in FIG. 3A, if a scanning motion across the scanner 14 is not detected, the routine 56 advances to step 66 (FIG. 3B). In step 66, the processing unit 12 scans or reads the data communication line 42 to determine whether the video system 16 has detected the customer placing an item on the product scale 22. In particular, the video system 16 generates an output signal which is sent to the processing unit 12 once the video system 16 detects the motion of the customer placing the item on the product scale 22. If an item is detected on the product scale 22, the routine 56 advances to a product weigh subroutine 130. If an item is not detected on the product scale 22, the routine 56 advances to step 132.

Figure 6:
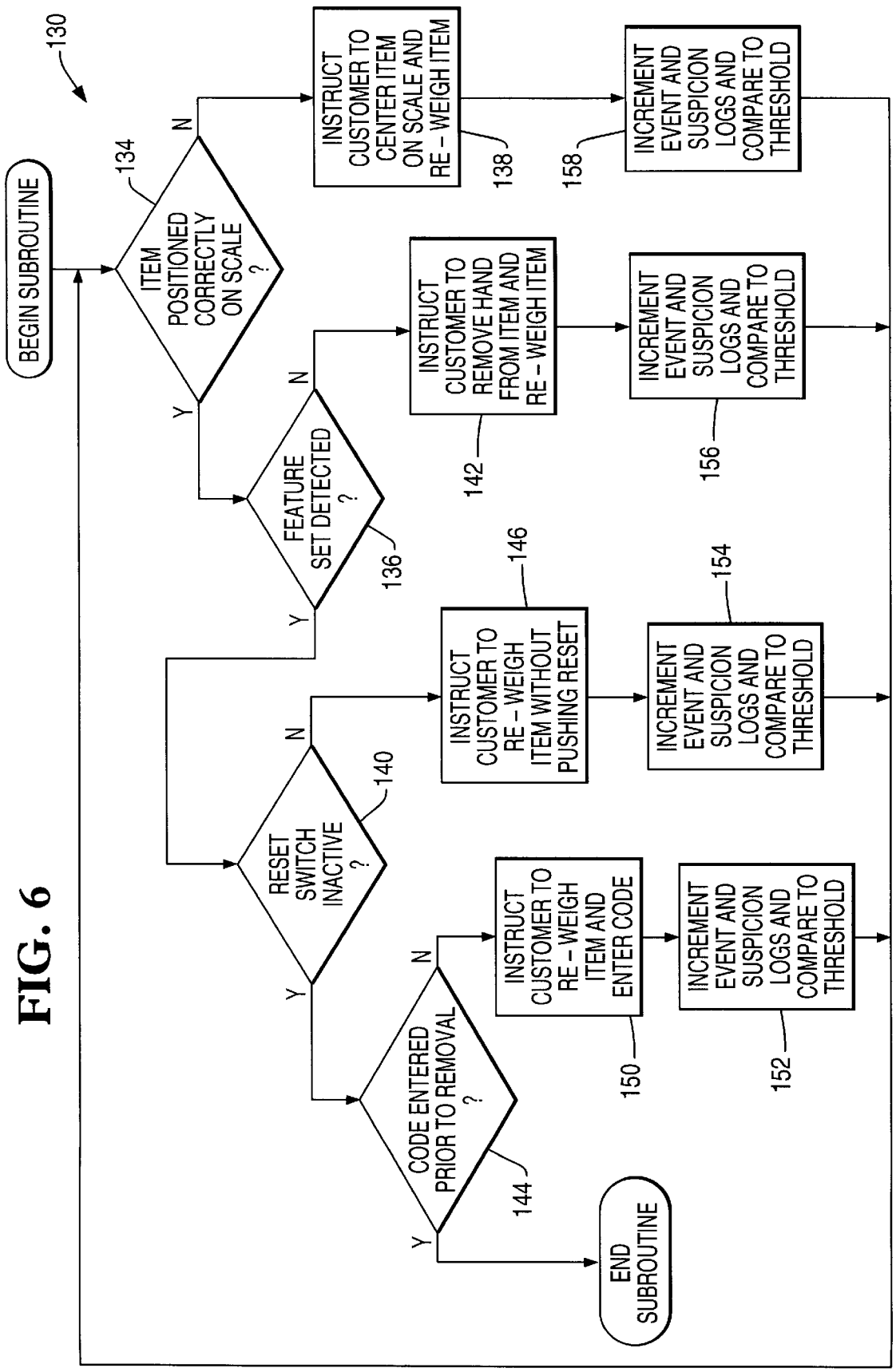
FIG. 6 is a flowchart setting forth in detail the product weigh subroutine of the itemization process.

Referring now to FIG. 6, there is shown a flow chart setting forth the product weigh subroutine 130 in greater detail. After completion of step 66 (FIG. 3B), the subroutine 130 advances to step 134. In step 134, the processing unit 12 scans or reads the data communication line 42 to determine whether the video system 16 has detected that the customer has correctly positioned the item to be weighed on the product scale 22. In particular, since the product scale 22 is integrated with the scanner 14, the video system 16 determines if the entire item is positioned on the product scale 22 by determining if the entire item is within the target area of the scanner 14. It should be appreciated that if a portion of the item being weighed on the product scale 22 is not positioned on the weight scale 22, the measured weight of the item may be erroneously low. If the item to be weighed is positioned correctly on the product scale 22, the subroutine 130 advances to step 136. If the item to be weighed is not positioned correctly on the product scale 22, the subroutine 130 advances to step 138.

In step 136, the processing unit 12 scans or reads the data communication line 42 to determine whether the video system 16 has detected a feature set associated with the item positioned on the product scale 22. It should be appreciated that the inability of the video system 16 to detect a feature set associated with the item positioned on the product scale 22 may be caused by the customer keeping his or her hand on the item as the product scale attempts to weigh the item thereby potentially causing the measured weight of the item to be erroneously low. If the feature set associated with item positioned on the product scale 22 is determined, the subroutine 130 advances to step 140. If the feature set associated with item positioned on the product scale 22 is not determined, the subroutine 130 advances to step 142.

In step 140, the processing unit 12 scans or reads the data communication line 48 to determine whether a reset switch associated with the product scale 22 has been pushed or otherwise activated by the customer. It should be appreciated that the activation of the reset switch of the product scale may cause the measured weight of the item to be erroneously low or even non-existent. If the reset switch is inactive or has otherwise not been pushed by the customer while the item is positioned on the product scale 22, the subroutine 130 advances to step 144. If the reset switch is pushed by the customer while the item is positioned on the product scale 22, the subroutine 130 advances to step 146.

In step 144, the processing unit 12 scans or otherwise reads the data communication line 49 to determine if the customer has properly input the product code associated with the item being weighed via the data input device 20 prior to removal thereof from the product scale 22. It should be appreciated that the processing unit 12 uses the product code to communicate with the network 28 to obtain the price of the properly weighed item for use in generating a bill or receipt at the end of the checkout procedure. If the product code associated with the item is properly entered via the data input device 20 prior to removal thereof from product scale 22, the subroutine 130 then ends thereby returning to step 148 in the routine 56 of FIG. 3B. If the product code associated with the item is not properly entered via the data input device 20 prior to removal thereof from the product scale 22, the subroutine 130 advances to step 150.

Step 148 in FIG. 3B follows the same procedure outlined above in regard to step 76. In particular, the processing unit 12 monitors the communication line 49 from the data input device 20, the communication line 44 from the display monitor 18, the communication line 42 from the video system 16, and the communication line 40 from the scanner 14 in order to determine whether there are more items to be scanned. More specifically, a message is displayed on the display monitor 18 instructing the customer to touch a particular touch screen area displayed on the display monitor 18, or to touch a particular key associated with the data input device 20, when the customer has completed scanning all of the items for purchase.

If a particular signal is detected on either of the communication lines 44 or 49, the processing unit 12 determines that the checkout procedure is complete and the routine 56 advances to the finalization step 58 in FIG. 2. If a signal is detected on either one or both of the communication lines 42, 40, the processing unit 12 determines that the customer is attempting to scan another item for purchase, and the routine advances to step 62.

Returning now to step 144 in FIG. 6, if the product code associated with the item being weighed is not properly entered via the data input device 20 prior to removal thereof from the product scale 22, the subroutine 130 advances to step 150. In step 150, the processing unit 12 causes a message to be displayed on the display monitor 18 which instructs the customer to reweigh the last item and enter a product code therefor. The subroutine 130 then advances to step 152.

In step 152, the processing unit 12 increments the event log and the suspicion log by a predetermined value. More specifically, the processing unit 12 generates an output signal which is sent to the memory device 30 which instructs the memory device 30 to increment both the event log and the suspicion log by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 130 then advances to step 134 to monitor the customer's attempt to reweigh the item.

In step 140, if the reset switch is pushed by the customer while the item is positioned on the product scale 22, the subroutine 130 advances to step 146. In step 146, the processing unit 12 causes a message to be displayed on the display monitor 18 which instructs the customer to reweigh the last item without pushing the reset switch. The subroutine 130 then advances to step 154.

Step 154 follows the same procedure outlined above in regard to step 152. In particular, the processing unit 12 increments the event log and the suspicion log by a predetermined value. More specifically, the processing unit 12 generates an output signal which is sent to the memory device 30 which instructs the memory device 30 to increment both the event log and the suspicion log by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 130 then advances to step 134 to monitor the customer's attempt to reweigh the item.

In step 136, if the feature set associated with item positioned on the product scale 22 is not determined, the subroutine 130 advances to step 142. In step 142, the processing unit 12 causes a message to be displayed on the display monitor 18 which instructs the customer to reweigh the last item without placing his or her hand on the item. The subroutine 130 then advances to step 156.

Step 156 follows the same procedure outlined above in regard to steps 152 and 154. In particular, the processing unit 12 increments the event log and the suspicion log by a predetermined value. More specifically, the processing unit 12 generates an output signal which is sent to the memory device 30 which instructs the memory device 30 to increment both the event log and the suspicion log by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 130 then advances to step 134 to monitor the customer's attempt to reweigh the item.

In step 134, if the item to be weighed is not positioned correctly on the product scale 22, the subroutine 130 advances to step 138. In step 138, the processing unit 12 causes a message to be displayed on the display monitor 18 which instructs the customer to center the item on the product scale 22. The subroutine 130 then advances to step 158.

Step 158 follows the same procedure outlined above in regard to step 152, 154, and 156. In particular, the processing unit 12 increments the event log and the suspicion log by a predetermined value. More specifically, the processing unit 12 generates an output signal which is sent to the memory device 30 which instructs the memory device 30 to increment both the event log and the suspicion log by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 130 then advances to step 134 to monitor the customer's attempt to reweigh the item.

Returning now to step 66 in FIG. 3B, if an item is not detected on the product scale 22, the routine 56 advances to step 132. Step 132 follows the same procedure outlined above with regard to step 64. In particular, the processing unit 12 scans or reads the data communication line 40 to determine whether the scanner 14 has successfully read or otherwise captured the bar code associated with the item. More specifically, the scanner 14 generates an output signal which is sent to the processing unit 12 once the scanner 14 successfully reads the product identification code off of the item. If the code is successfully read from the item, the routine 56 advances to step 160. If the code is not successfully read from the item, the routine 56 advances to step 162.

Step 160 follows the same procedure outlined above in regard to step 68. In particular, the processing unit 12 determines if the scanned item is placed into one of the grocery bags in the bagwell. More specifically, the video system 16 generates an output signal which is sent to the processing unit 12 once the video camera has detected a customer placing the item into one of the grocery bags. As discussed above, after scanning an item, the customer may opt not to immediately place the item into one of the grocery bags. Hence, whether or not the video system 16 generates an output signal in step 160, the routine 56 is advanced to step 164.

In step 164, the processing unit 12 determines that a successful checkout operation has been completed for the particular item selected for purchase. More specifically, the processing unit 12 concludes that the customer apparently scanned an item over the scanner 14 because the scanner 14 generated an output signal on the data communication line 40. However, because the video system 16 did not generate an output signal on the data communication line 42, the processing unit 12 concludes that the video system 16 is not functioning properly. The processing unit 12 then communicates with the network 28 to obtain the price of the properly scanned item for use in generating a bill or receipt at the end of the checkout procedure. The routine 56 then advances to step 166.

In step 166, the processing unit updates the suspicion log. In particular, the processing unit 12 queries the memory device 30 to determine if the item that was successfully scanned in step 132 had previously been unsuccessfully scanned. If the customer has not previously attempted to scan the item that was successfully scanned in step 132, no change is made to the suspicion log. However, if the customer has previously attempted to scan the item which was successfully scanned in step 132, the processing unit 12 determines what change, if any, should be made to the suspicion log.

As discussed above, if the processing unit 12 determines that the item that was successfully scanned in step 132 was previously unsuccessfully scanned in an alpha-type event, the processing unit 12 causes the suspicion log to be decreased by a predetermined value such as ½. However, if the processing unit 12 determines that the item that was successfully scanned in step 132 was previously scanned unsuccessfully in a beta-type event, the processing unit 12 does not change the value of the suspicion log.

Since the processing unit 12 also determined that the video system 16 is not functioning properly in step 164, the processing unit 12 increments the maintenance log thereby recording the potential malfunction of the video system 16. If the value of the maintenance log exceeds a predetermined threshold, an error message is sent across the network 28 by the processing unit 12 thereby requesting immediate maintenance attention. The routine 56 then advances to step 148.

As discussed above, in step 148 the processing unit 12 monitors the communication line 49 from the data input device 20, the communication line 44 from the display monitor 18, the communication line 42 from the video system 16, and the communication line 40 from the scanner 14 in order to determine whether there are more items to be scanned. In particular, a message is displayed on the display monitor 18 instructing the customer to touch a particular touch screen area displayed on the display monitor 18, or to touch a particular key associated with the data input device 20, when the customer has completed scanning all of the items for purchase.

If a particular signal is detected on either of the communication lines 44 or 49, the processing unit 12 determines that the checkout procedure is complete and the routine 56 advances to the finalization step 58 in FIG. 2. If a signal is detected on either one or both of the communication lines 42, 40, the processing unit 12 determines that the customer is attempting to scan another item for purchase, and the routine advances to step 62.

Returning now to step 132, if the product identification code was not successfully read from the item being scanned, the routine 56 advances to step 162. Step 162 follows the same procedure outlined above with regard to step 68. In particular, the processing unit 12 determines if the unscanned item is placed into one of the grocery bags in the bagwell. More specifically, the video system 16 generates an output signal which is sent to the processing unit 12 once the video system 16 has detected the customer placing the unscanned item into one of the grocery bags. If the unscanned item is placed into one of the grocery bags, the routine 56 advances to step 168. If the unsuccessfully scanned item is not placed into one of the grocery bags, the routine advances to step 170.

In step 168, the processing unit 12 determines the feature set and the weight of the item that was placed into the grocery bag. More specifically, the video system 16 generates an output signal which is sent to the processing unit 12 once the video system 16 has determined the feature set of the item being placed into the grocery bag. Additionally, the bag scale 24 generates an output signal which is sent to the processing unit 12 once the bag scale 24 has determined the weight of the item being placed in the grocery bag. The routine 56 then advances to step 172.

In step 172, the processing unit 12 causes a message to be displayed on the display monitor 18 which instructs the customer to remove the item from the grocery bag and thereafter re-scan the item. The routine 56 then advances to step 174.

In step 174, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the routine 56 then advances to a re-scan subroutine 176.

Figure 7:
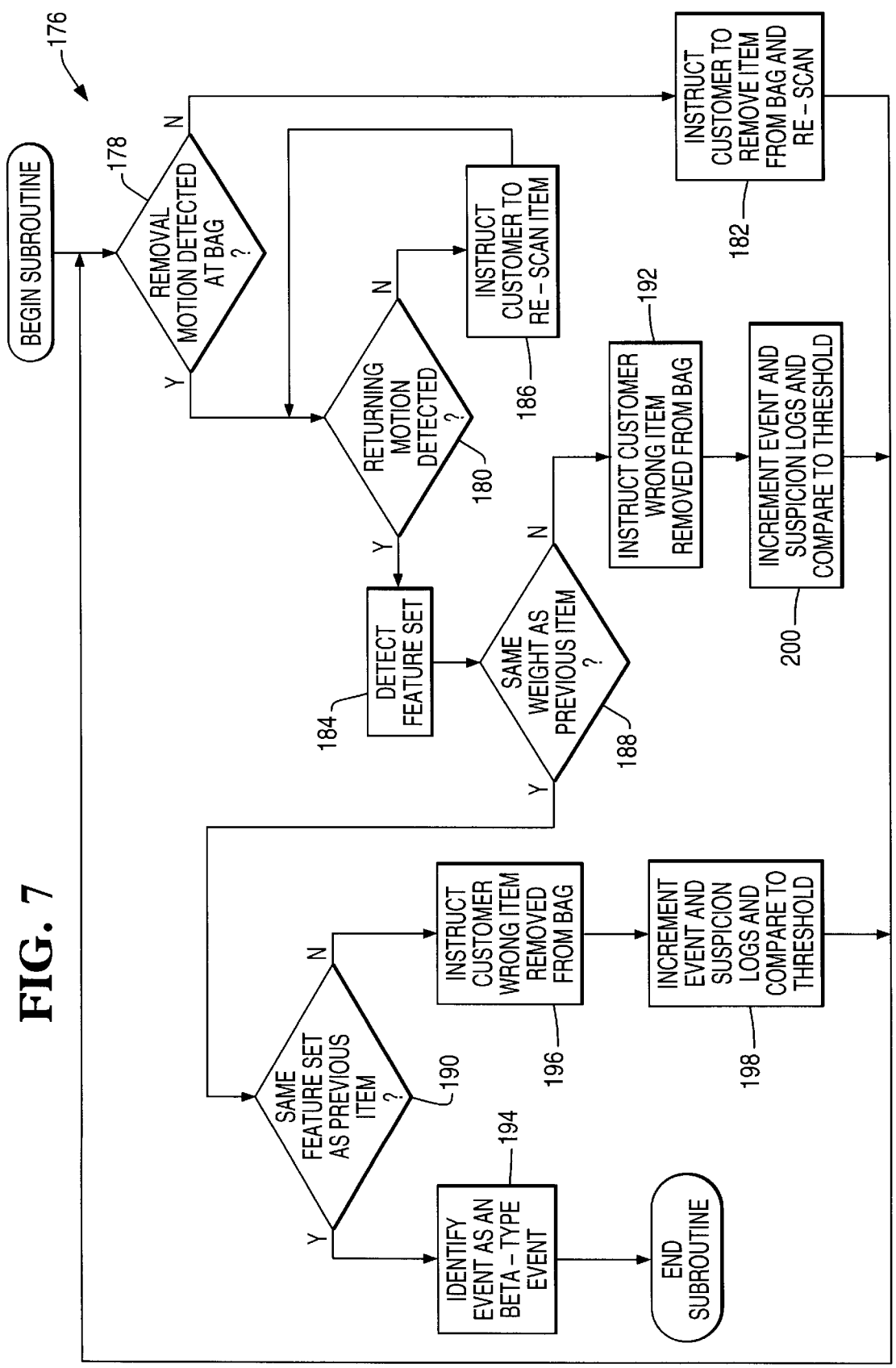
FIG. 7 is a flowchart setting forth in detail a third re-scan subroutine of the itemization process.

Referring now to FIG. 7, there is shown a flow chart setting forth the re-scan subroutine 176 in greater detail. After completion of step 174 in FIG. 3B, the subroutine 176 advances to step 178. In step 178, the processing unit 12 determines if the customer removed the unscanned item from the grocery bag as instructed. More specifically, the video system 16 generates an output signal which is sent to the processing unit 12 once the video system 16 has detected the customer removing the unscanned item from the grocery bag. If the unscanned item is removed from the grocery bag, the subroutine 176 advances to step 180. If the unscanned item is not removed from the grocery bag, the subroutine 176 advances to step 182.

In step 180, the processing unit 12 scans or reads the data communication line 42 to determine whether the video system 16 has detected motion associated with the customer moving the unscanned item across the target area of the scanner 14 in a direction which is opposite to the direction that the customer would move the item if the customer was attempting to scan the item. It should be appreciated that motion is indicative of the customer returning the item to the area proximate the scanner 14 for a subsequent scanning attempt.

The video system 16 generates an output signal which is sent to the processing unit 12 once the video system 16 has detected the customer returning the unscanned item to the area proximate the scanner 14. If the unscanned item is returned to the area proximate the scanner 14, the subroutine 176 advances to step 184. If the unscanned item is not returned to the area proximate the scanner 14, the subroutine 176 advances to step 186.

In step 184, the processing unit 12 stores into a memory location associated therewith a file which includes a digital image of a feature set associated with the item that was returned across the area proximate scanner 14 in step 180. After the processing unit 12 determines the feature set associated with the item being returned, the subroutine 176 advances to step 188.

In step 188, the processing unit 12 determines the weight of the item which was removed from the grocery bag. More specifically, upon removal of the item from the grocery bag, the bag scale 24 generates an output signal which is sent to the processing unit 12 once the bag scale 24 has determined the weight of the item being removed from the grocery bag. The processing unit 12 then compares the weight of the item that was removed from the bag with the weight of the item that was placed in the bag as determined by the bag scale 24 in step 168 in FIG. 3B. If the weight of the item being removed from the grocery bag is determined to be the same as the weight of the item that was placed into the grocery bag (within an acceptable tolerance range), the subroutine 176 advances to step 190. If the weight of the item being removed from the grocery bag is determined not to be the same as the weight of the item that was placed into the grocery bag, the subroutine 176 advances to step 192.

In step 190, the processing unit 12 determines if the feature set of the item that was removed from the grocery bag is the same as the feature set of the item that was placed in the grocery bag. In particular, the processing unit 12 compares the electronic file of the feature set of the item that was removed from the grocery bag (as detected in step 184) with the electronic file of the feature set of the item that was placed in the bag (as detected in step 168 of FIG. 3B). If the feature set of the item being removed from the grocery bag is determined to be the same as the feature set of the item that was placed into the grocery bag (within an acceptable tolerance range), the subroutine 176 advances to step 194. If the feature set of the item being removed from the grocery bag is determined not to be the same as the feature set of the item that was placed into the grocery bag, the subroutine 176 advances to step 196.

In step 194, the processing unit 12 determines that the customer has successfully removed the proper item from the grocery bag in order to re-scan the item. In particular, the processing unit 12 concludes that (1) the customer removed an item from the grocery bag (step 178), (2) the customer returned the item to the area proximate the scanner 14 (step 180), (3) the item removed from the grocery bag has the same weight as the item placed in the grocery bag (step 188), and (4) the item removed from the grocery bag has the same feature set as the item placed in the grocery bag (step 190).

Further in step 194, the processing unit 12 determines (1) there is a relatively high probability that the customer is attempting to commit an impropriety such as theft since (1) motion indicative of a scanning attempt was not detected in step 62 (FIG. 3A), (2) the item was in fact not scanned in step 132, and (3) the item was nonetheless placed in a grocery bag in step 162. Therefore, the processing unit 12 identifies the event as a beta-type event. More specifically, the processing unit 12 generates an output signal which is sent to the memory device 30 which identifies the event as a beta-type event. Therefore, even if the item is subsequently scanned correctly, the suspicion log will not be decreased. The subroutine 176 then ends thereby returning to step 62 of the routine 56 to monitor the re-scanning attempt of the item.

Returning now to step 190, if the feature set of the item removed from the grocery bag is not the same as the feature set of the item that was placed in the bag, the subroutine 176 advances to step 196. In step 196 the processing unit 12 causes a message to be displayed on the display monitor 18 which instructs the customer that the wrong item was removed from the grocery bag and that the correct item should be removed from the grocery bag for re-scanning. The subroutine 176 then advances to step 198.

In step 198, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 176 then advances to step 178 to monitor the removal of a subsequent item from the grocery bag.

Returning now to step 188, if the weight of the item removed from the grocery bag is not the same as the weight of the item that was placed in the bag, the subroutine 176 advances to step 192. In step 192, the processing unit 12 causes a message to be displayed on the display monitor 18 which instructs the customer that the wrong item was removed from the grocery bag and that the correct item should be removed from the grocery bag for re-scanning. The subroutine 176 then advances to step 200.

Step 200 follows the same procedure outlined above with regard to step 198. In particular, the processing unit 12 increments the event log and the suspicion log by a predetermined value. More specifically, the processing unit 12 generates an output signal which is sent to the memory device 30 which causes the event log and the suspicion log to be incremented in the memory device 30 by a value of one.

Thereafter, the processing unit 12 determines if the total value of either the event log or the suspicion log exceeds the respective predetermined threshold value for each log. More specifically, if the event log exceeds its predetermined threshold value, the processing unit 12 causes an output signal to be sent to the network 28 which in turn pages or otherwise summons the retailer's personnel in order to assist the customer. In addition, if the suspicion log exceeds its predetermined threshold value, the processing unit 12 causes an output signal to be sent to the network 28 which in turn pages or otherwise summons the retailer's personnel such as security personnel to audit or otherwise investigate the customer's transaction. If neither the event log nor the suspicion log exceeds its respective threshold value, the subroutine 176 then advances to step 178 to monitor the removal of a subsequent item from the grocery bag.

Returning now to step 180, if the unscanned item is not returned to the area proximate the scanner 14 within a reasonable period of time, the subroutine 176 advances to step 186. In step 186, the processing unit 12 causes a message to be displayed on the display monitor 18 which instructs the customer to re-scan the item which was removed from the grocery bag. The subroutine 176 then loops back to step 180.

Returning now to step 178, if the unscanned item is not removed from the grocery bag within a reasonable period of time, the subroutine 176 advances to step 182. In step 182, the processing unit 12 causes a message to be displayed on the display monitor 18 which re-instructs the customer to remove the item from the grocery bag. The subroutine 176 then loops back to step 178.

Returning now to step 162 of the routine 56 (see FIG. 3B), if the unscanned item is not placed in the grocery bag, the routine 56 advances to step 170. In step 170, since (1) the video system 16 did not generate an output signal on the data communication line 42 indicating that a scanning motion was detected in the target area of the scanner 14, (2) the video system 16 did not generate an output signal on the data communication line 42 indicating that an item was placed on the product scale 22, (3) the scanner 14 did not generate an output signal on the data communication line 40 indicating an item was scanned, and (4) the video camera did not generate an output signal on the data communication line 42 indicating an item was placed into one of the grocery bags in the bagwell, the processing unit 12 concludes that there is no present attempt being made by a customer to scan or otherwise checkout an item. Thus, the routine 56 advances to step 62 to loop through the routine 56 once again.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

What is claimed is:

1. A method of providing security during operation of a self-service checkout terminal, comprising the steps of:

generating an item-entered control signal if a product code associated with an item is entered into the terminal;

detecting insertion of the item into a grocery container with a video system and generating a detection control signal in response thereto, wherein the detecting step includes the steps of (i) capturing video images associated with movement of the item with a video camera associated with the video system, (ii) storing electronic representations of the video images in a memory device associated with the video system, (iii) analyzing the stored electronic representations of the video images so as to determine if a user has inserted the item into the grocery container, and (iv) generating the detection control signal if it is determined in the analyzing step that the user has inserted the item into the grocery container; and generating an invalid-use control signal if the item-entered control signal has not been generated prior to generation of the detection control signal.

2. The method of claim 1, further comprising the step of generating a message which instructs a user to remove the item from the grocery container in response to generation of the invalid-use control signal.

3. The method of claim 1, further comprising the steps of:

updating an electronic log value in response to generation of the invalid-use control signal; and comparing the log value to a log threshold and generating a personnel signal in response thereto.

4. The method of claim 1, further comprising the steps of:

generating a valid-use control signal if the item-entered control signal has been generated prior to generation of the detection control signal; and entering a record corresponding to the item in a transaction table in response to generation of the valid-use control signal.

5. The method of claim 1, further comprising the steps of:

detecting removal of the item from the grocery container with the video system in response to the invalid-use control signal; and generating a removal control signal in response to the item removal detecting step.

6. The method of claim 5, further comprising the steps of:

detecting a first feature set of the item with the video system prior to insertion of the item into the grocery container;

detecting a second feature set of the item with the video system in response to generation of the removal control signal; and comparing the first feature set with the second feature set and generating a mismatch control signal if the first feature is not the same as the second feature set.

7. The method of claim 6, further comprising the step of generating a message which instructs a user that an incorrect item was removed from the grocery container in response to generation of the mismatch control signal.

8. The method of claim 7, further comprising the steps of:

generating a match control signal if the first feature set is the same as the second feature set; and generating a message which instructs the user to re-enter the item in response to generation of the match control signal.

9. The method of claim 5, further comprising the steps of:

detecting a first weight of the grocery container with a scale prior to generation of the detection control signal;

detecting a second weight of the grocery container with the scale in response to generation of the removal control signal; and comparing the first weight with the second weight and generating a mismatch control signal if the first weight is not the same as the second weight.

10. The method of claim 9, further comprising the step of generating a message which instructs a user that an incorrect item was removed from the grocery container in response to generation of the mismatch control signal.

11. The method of claim 10, further comprising the steps of:
   generating a match control signal if the first weight is the same as the second weight; and
   generating a message which instructs the user to re-enter the item in response to generation of the match control signal.

12. The method of claim 1, further comprising the steps of:
   detecting movement of the item within a scanner zone associated with the terminal and generating a scanning-attempt control signal in response thereto;
   generating the item-entered control signal if the movement of the item within the scanner zone causes the product code associated with the item to be entered into the terminal; and
   generating an attempt-failed control signal if the movement of the item within the scanner zone (1) causes generation of the scanning-attempt control signal, and (2) does not cause generation of the item-entered control signal.

13. The method of claim 12, further comprising the step of generating a message which instructs a user to re-scan the item in response to generation of the attempt-failed control signal.

14. The method of claim 12, further comprising the steps of:
   updating an electronic log value in response to generation of the attempt-failed control signal; and
   comparing the log value to a log threshold and generating a personnel signal in response thereto.

15. The method of claim 1, further comprising the steps of:
   detecting placement of the item within a weight scale zone associated with the terminal with the video system and generating a scale-placement control signal in response thereto;
   detecting removal of the item from the weight scale zone with the video system and generating a scale-removal control signal in response thereto;
   generating an invalid-weight control signal if the item-entered control signal is not generated (1) subsequent to generation of the scale-placement control signal, and (2) prior to generation of the scale-removal control signal; and
   generating a first message which instructs a user to re-weigh the item in response to generation of the invalid-weight control signal.

16. The method of claim 15, wherein the item placement detecting step includes the step of detecting placement of the entire item within the weight scale zone.

17. The method of claim 15, wherein the terminal includes a product scale positioned in the weight scale zone, further comprising the steps of:
   generating a reset-active control signal if a reset switch associated with the product scale is actuated;
   generating an invalid-reset control signal if the reset-active control signal is generated (1) subsequent to generation of the scale-placement control signal, and (2) prior to generation of the item-entered control signal; and
   generating a second message which instructs a user to re-weigh the item in response to generation of the invalid-reset control signal.

18. A method of providing security during operation of a self-service checkout terminal, comprising the steps of:
   detecting movement of an item within a scanner zone associated with the terminal with a video system and generating a scanning-attempt control signal in response thereto;
   generating an item-entered control signal if a product code associated with the item is entered into the terminal;
   generating an attempt-failed control signal if the item-entered control signal is not generated in response to the movement of the item within the scanner zone;
   detecting insertion of the item into a grocery container with the video system and generating a detection control signal in response thereto; and
   generating an invalid-use control signal if the item-entered control signal has not been generated prior to generation of the detection control signal.

19. The method of claim 18, further comprising the steps of:
   detecting placement of the item within a weight scale zone associated with the terminal with the video system and generating a scale-placement control signal in response thereto;
   detecting removal of the item from the weight scale zone with the video system and generating a scale-removal control signal in response thereto;
   generating an invalid-weight control signal if the item-entered control signal is not generated (1) subsequent to generation of the scale-placement control signal, and (2) prior to generation of the scale-removal control signal; and
   generating a message which instructs a user to re-weigh the item in response to generation of the invalid-weight control signal.

20. The method of claim 19, further comprising the steps of:
   updating an electronic log value in response to generation of (1) the attempt-failed control signal, (2) the invalid-use control signal, or (3) the invalid-weight control signal; and
   comparing the log value to a log threshold and generating a personnel signal in response thereto.

* * * * *